(12) United States Patent
Imaoku et al.

(10) Patent No.: US 9,389,340 B2
(45) Date of Patent: Jul. 12, 2016

(54) OPTICAL FILM, METHOD FOR PRODUCING SAME, AND METHOD FOR CONTROLLING OPTICAL CHARACTERISTICS OF SAME

(75) Inventors: Takao Imaoku, Osaka (JP); Tokio Taguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 656 days.

(21) Appl. No.: 13/378,719

(22) PCT Filed: Mar. 24, 2010

(86) PCT No.: PCT/JP2010/055116
§ 371 (c)(1),
(2), (4) Date: Dec. 16, 2011

(87) PCT Pub. No.: WO2011/013401
PCT Pub. Date: Feb. 3, 2011

(65) Prior Publication Data
US 2012/0087012 A1    Apr. 12, 2012

(30) Foreign Application Priority Data
Jul. 28, 2009    (JP) .................................. 2009-175703

(51) Int. Cl.
*G02B 1/118* (2015.01)
*G09F 9/30* (2006.01)

(52) U.S. Cl.
CPC . *G02B 1/118* (2013.01); *G09F 9/30* (2013.01); *Y10T 29/49* (2015.01)

(58) Field of Classification Search
CPC ............ G02B 1/10; G02B 1/11; G02B 1/118; G02B 5/045; G02B 6/0053; G02B 27/0018; G02F 1/133502–1/133504; G02F 2001/133607; G02F 2001/133507
USPC .......................... 359/601, 613; 362/326, 339
See application file for complete search history.

(56) References Cited

U.S. PATENT DOCUMENTS

| | | | | |
|---|---|---|---|---|
| 5,477,239 | A | * 12/1995 | Busch et al. | ................... 345/102 |
| 5,763,049 | A | 6/1998 | Frey et al. | |
| 6,068,382 | A | * 5/2000 | Fukui et al. | ................... 362/625 |
| 6,166,787 | A | * 12/2000 | Akins et al. | ..................... 349/57 |

(Continued)

FOREIGN PATENT DOCUMENTS

| | | | |
|---|---|---|---|
| JP | 2003004916 A | 1/2003 | |
| JP | 2004205990 A | 7/2004 | |

(Continued)

OTHER PUBLICATIONS

PCT/ISA/210, Jul. 2009.

*Primary Examiner* — Derek S Chapel
(74) *Attorney, Agent, or Firm* — Harness, Dickey & Pierce, P.L.C.

(57) ABSTRACT

Disclosed are: an optical film which has a moth eye structure; a method for producing the optical film; and a method for controlling the optical characteristics of the optical film. An embodiment discloses an optical film having a moth eye structure that includes a plurality of projections, wherein the plurality of projections include a plurality of slanted projections that are inclined to a film surface and the plurality of slanted projections are inclined in a generally same direction when the film surface is viewed in plan. Also disclosed is a method for producing an optical film having a moth eye structure, including applying a physical force to the moth eye structure. Further specifically disclosed is a method for controlling the optical characteristics of an optical film having a moth eye structure that includes a plurality of projections, the method including applying a physical force to the moth eye structure.

9 Claims, 10 Drawing Sheets

(56) References Cited

U.S. PATENT DOCUMENTS

| | | | |
|---|---|---|---|
| 6,285,425 B1* | 9/2001 | Akins et al. | 349/113 |
| 6,329,968 B1* | 12/2001 | Cornelissen et al. | 345/87 |
| 6,543,901 B2* | 4/2003 | Moon | 359/613 |
| 7,139,125 B1* | 11/2006 | Mi | 359/485.02 |
| 7,424,197 B2* | 9/2008 | Winston | F21V 5/02 385/146 |
| 2003/0011315 A1 | 1/2003 | Ito et al. | |
| 2005/0068630 A1* | 3/2005 | Nitz | E06B 9/24 359/613 |
| 2005/0074579 A1 | 4/2005 | Suzuki et al. | |
| 2007/0291368 A1* | 12/2007 | Yokota | 359/613 |
| 2007/0297747 A1* | 12/2007 | Biernath | G02B 5/3083 385/147 |
| 2008/0304283 A1* | 12/2008 | Parker | F21V 5/00 362/607 |

FOREIGN PATENT DOCUMENTS

| | | |
|---|---|---|
| JP | 2005187770 A | 7/2005 |
| JP | 2007264613 A | 10/2007 |

* cited by examiner (a)

(b)

(a)

(b)

(a)

(b)

(a)

(b)

OPTICAL FILM, METHOD FOR PRODUCING SAME, AND METHOD FOR CONTROLLING OPTICAL CHARACTERISTICS OF SAME

TECHNICAL FIELD

The present invention relates to an optical film, a method for producing the same, and a method for controlling the optical characteristics thereof. The present invention specifically relates to an optical film suitable as an antipeep sheet (privacy sheet) or an ornament, a method for producing the same, and a method for controlling the optical characteristics thereof.

BACKGROUND ART

Displays such as cathode ray tube (CRT) displays, liquid crystal displays (LCDs), plasma display panels (PDPs), and electroluminescence (EL) displays are required to have various functions on their surfaces, such as scratch prevention, prevention of natural light reflection, and fouling prevention.

A moth-eye structure, which can provide an ultra-antireflection effect without light interference, is being focused on as means for achieving low reflection on display surfaces of displays.

In addition, an antireflection film comprising a transparent substrate, a hardcoat layer including at least one layer, and a low-refractive-index layer at an outermost layer is disclosed as means for preventing reflection of natural light; in such an antireflection film, the haze of the hardcoat layer is 40% or higher, the surface roughness Ra is 0.10 µm or lower, and the average value of 5-degree specular reflectivities is 65% or higher to the average value of integral reflectivities within a wavelength range from 450 nm to 650 nm (for example, see Patent Document 1).

Patent Document 1: JP 2005-187770 A

SUMMARY OF THE INVENTION

FIG. 20 is a schematic cross-sectional view showing a liquid crystal display device with a conventional moth-eye-structured optical film (moth-eye film) attached thereon.

As shown in FIG. 20, the conventional liquid crystal display device comprises a liquid crystal display panel 150, a polarizer 160 attached on the liquid crystal display panel 150, and a moth-eye film 111 attached on the polarizer 160.

The liquid crystal display panel 150 comprises a pair of glass substrates 151 and 153 and liquid crystal layer 156 disposed between the glass substrates 151 and 153. A driving element layer 152 comprising a thin film transistor (TFT) layer and an ITO (indium tin oxide) layer is formed on the glass substrate 151. A color filter (CF) layer 154 and an ITO layer 155 are formed on the glass substrate 153.

The polarizer 160 comprises a triacetyl cellulose (TAC) film 161, a retardation film 163, a polarizer 162 disposed between the TAC film 161 and the retardation film 163, and an adhesive layer 164 for attaching the polarizer 160 to the liquid crystal display panel 150. The polarizer 162 is mainly made from a polyvinyl alcohol resin containing iodine.

The moth-eye film 111 has on its surface a moth-eye structure including multiple protrusions 112.

In the conventional moth-eye film 111, however, the moth-eye structure is formed in a manner such that protrusions 112 extend isotropically to the incident light, in other words, extend vertically to the main face of the film 111, as shown in FIG. 21, in order to reduce surface reflection in any observing direction. Thus, light from the inside of the panel 150 isotropically passes through the moth-eye film 111, and surface reflection of natural light is isotropically suppressed by the moth-eye film 111. Therefore, it is difficult to give directivity (anisotropy) to the optical characteristics of the moth-eye film 111. This is because the protrusions 112 extend vertically to the main face of the film 111, and thus the optical characteristics of the moth-eye structure do not show directivity.

Further, in the technique disclosed in Patent Document 1, the hardcoat layer contains hollow silica particles. These particles, however, are arranged at random, and thus the layer is not able to control light scattering. Alternatively, a mode is proposed in which different kinds of particles are mixed in the hardcoat layer; however, the arrangement of the respective kinds of particles cannot be controlled.

The present invention is devised in view of the above problems, and aims to provide an optical film with a moth-eye structure whose optical characteristics such as reflection and scattering show directivity, a method for producing the same, and a method for controlling the optical characteristics.

The present inventors have performed various studies on an optical film with a moth-eye structure whose optical characteristics such as reflection and scattering show directivity, and thus have focused on protrusions which constitute the moth-eye structure. Then, they have found that the characteristics of light such as reflection and scattering can be controlled depending on difference in the incident direction by providing a moth-eye structure having multiple inclined protrusions which are inclined to a direction oblique to the main face of the film and which are inclined in substantially the same direction in a plan view of the main face of the film. As a result, the present inventors have arrived at the solution of the above problems, and have completed the present invention.

Thus, the present invention relates to an optical film, comprising a moth-eye structure comprising multiple protrusions, wherein the protrusions include multiple inclined protrusions which are oblique to a main face of the film, and the inclined protrusions is inclined to substantially the same direction in a plan view of the main face of the film.

The expression "substantially the same direction" herein is preferably the same direction to the extent that a human eye can recognize the directivity in the optical characteristics of the optical film of the present invention. Specifically, variations in the inclination directions of the multiple inclined protrusions rubbed in the same direction are preferably within 45°, more preferably within 30°, further preferably within 20°, and particularly preferably within 10°, in a plan view of the main face of the film. These preferable ranges of the direction of the inclination in the plan view of the main face of the film are defined by calculating the range of the inclination directions of the inclined protrusions which can lead to the aforementioned effects owing to the moth-eye structure and stable directivity based on SEM photographs of optical films made from various materials under various conditions.

The configuration of the optical film of the present invention is not especially limited by other components as long as it essentially includes such components.

Preferable modes of the optical film of the present invention are mentioned in more detail below. The following modes may be employed in combination.

As mentioned above, the optical film preferably has an optical characteristic that shows directivity in a direction oblique to the main face of the film.

The inclined protrusions are preferably formed by application of physical force to the protrusions. Thereby, the optical film of the present invention can be easily produced.

The number density of the inclined protrusions is preferably 0.5 pcs/µm² or more, more preferably 0.7 pcs/µm² or more, further preferably 0.8 pcs/μm² or more, and particularly preferably 0.85 pcs/μm² or more. If the number density is less than 0.5 pcs/μm², directivity may not be given to the optical characteristics of the optical film of the present invention.

Preferably, the moth-eye structure has a sticking structure (bundle structure) and the sticking structure includes a plurality of the protrusions whose tip portions are linked to each other. The sticking structure preferably satisfies a number density of 0.40 pcs/μm² or less, more preferably 0.35 pcs/μm² or less, further preferably 0.30 pcs/μm² or less, and particularly preferably 0.26 pcs/μm² or less.

Preferably, the protrusions include the inclined protrusions at a peripheral portion of the optical film, and the inclined protrusions at the peripheral portion are inclined to the inside of the film in a plan view of the main face of the optical film. Thereby, the optical film of the present invention can be suitably used as an antipeep sheet for devices whose displays are observed mainly from the front direction.

The number density of the inclined protrusions may vary in the main face of the optical film. Thereby, the visibility of the optical film of the present invention for an observer viewing the optical film of the present invention from the front direction can be more improved. In addition, the optical film of the present invention can be suitably used as an ornament.

The inclined protrusions may have different inclination angles in the main face of the optical film. Thereby, the visibility of the optical film of the present invention for an observer viewing the optical film of the present invention from the front direction can be more improved. In addition, the optical film of the present invention can be suitably used as an ornament.

The present invention also relates to a method for producing an optical film with a moth-eye structure including multiple protrusions. The method comprises the step (physical step) of applying physical force to the moth-eye structure. Thereby, the optical film of the present invention can be easily produced.

The production method of an optical film of the present invention is not especially limited by other steps as long as it essentially includes the above step.

Preferable modes of the production method of an optical film of the present invention are mentioned in more detail below. The following modes may be employed in combination.

The step (physical step) preferably includes a rubbing sub-step of rubbing the moth-eye structure in a predetermined direction. Thereby, the optical film of the present invention can be more easily produced.

The rubbing sub-step preferably includes a further sub-step of mechanically rubbing the moth-eye structure. Thereby, the optical film of the present invention having predetermined optical characteristics can be produced with good reproducibility.

The rubbing sub-step is preferably performed at a pressing pressure of 50 kPa (0.5 kgw/cm²) or higher, more preferably 200 kPa (2.0 kgw/cm²) or higher, and further preferably 290 kPa (3.0 kgw/cm²) or higher.

A pressing pressure of 50 kPa or higher can securely give directivity to a moth-eye structure which is formed from a material having a glass transition temperature (Tg) of 48° C. or lower and whose protrusions are formed at a pitch of 200 nm or less each with a height of 255 nm or higher.

A pressing pressure of 200 kPa or higher can securely give directivity to a moth-eye structure which is formed from a material having a Tg of 65° C. or lower and whose protrusions are formed at a pitch of 200 nm or less each with a height of 255 nm or higher.

A pressing pressure of 290 kPa or higher can securely give directivity to a moth-eye structure which is formed from a material having a Tg of 84° C. or lower and whose protrusions are formed at a pitch of 200 nm or less each with a height of 255 nm or higher.

The present invention also relates to a method for controlling an optical characteristic of an optical film with a moth-eye structure including multiple protrusions. The method comprises the step of applying physical force to the moth-eye structure. Thereby, the directivity can be easily given to an optical characteristic such as reflection and scattering of an optical film with a moth-eye structure.

The controlling method for the optical film of the present invention is not especially limited by other steps as long as it essentially includes the above step.

Preferable modes of the controlling method for the optical film of the present invention are mentioned in more detail below. The following modes may be employed in combination.

In the above controlling method, the moth-eye structure is preferably rubbed in a predetermined direction. Thereby, the directivity can be more easily given to an optical characteristic of an optical film with a moth-eye structure.

In the above controlling method, the moth-eye structure is preferably mechanically rubbed. Thereby, a predetermined directivity can be given to an optical characteristic of an optical film with a moth-eye structure with good reproducibility.

In the above controlling method, the moth-eye structure is preferably rubbed while a pressure of preferably 50 kPa (0.5 kgw/cm²) or higher is applied to the moth-eye structure; the moth-eye structure is more preferably rubbed while a pressure of 200 kPa (2.0 kgw/cm²) or higher is applied to the moth-eye structure; and the moth-eye structure is further preferably rubbed while a pressure of 290 kPa (3.0 kgw/cm²) or higher is applied to the moth-eye structure.

A pressure of 50 kPa or higher can securely give directivity to a moth-eye structure which is formed from a material having a Tg of 48° C. or lower and whose protrusions are formed at a pitch of 200 nm or less each with a height of 255 nm or higher.

A pressure of 200 kPa or higher can securely give directivity to a moth-eye structure which is formed from a material having a Tg of 65° C. or lower and whose protrusions are formed at a pitch of 200 nm or less each with a height of 255 nm or higher.

A pressure of 290 kPa or higher can securely give directivity to a moth-eye structure which is formed from a material having a Tg of 84° C. or lower and whose protrusions are formed at a pitch of 200 nm or less each with a height of 255 nm or higher.

Effects of the Invention

The present invention can provide an optical film which has a moth-eye structure and whose optical characteristics such as reflection and scattering show directivity.

BRIEF DESCRIPTION OF THE DRAWINGS

FIG. 1(a) is a cross-sectional view and FIG. 1(b) is a plan view (overhead view).

FIG. 16(a) is a plan view, FIG. 16(b) is an enlarged cross-sectional view of the region circled as A in FIG. 16(a), and FIG. 16(c) is an enlarged cross-sectional view of the region circled as B in FIG. 16(a).

FIG. 17(a) is a plan view and FIG. 17(b) is an enlarged cross-sectional view of the region circled as C in FIG. 17(a).

FIG. 21(a) is a cross-sectional view and FIG. 21(b) is a plan view (overhead view).

MODES FOR CARRYING OUT THE INVENTION

Figure 1:
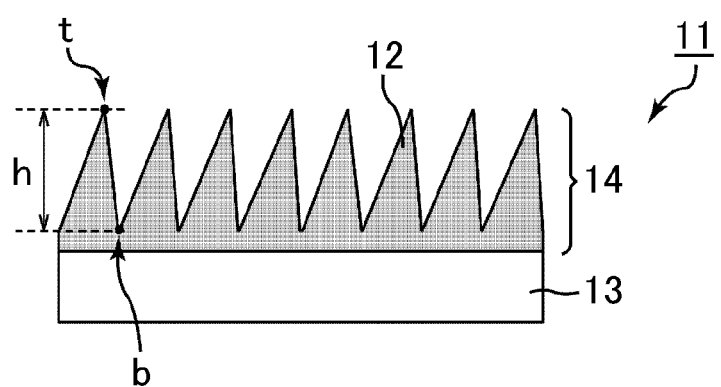
FIGS. 1(a) and 1(b) are schematic views showing the optical film of Embodiment 1.
Figure 1:
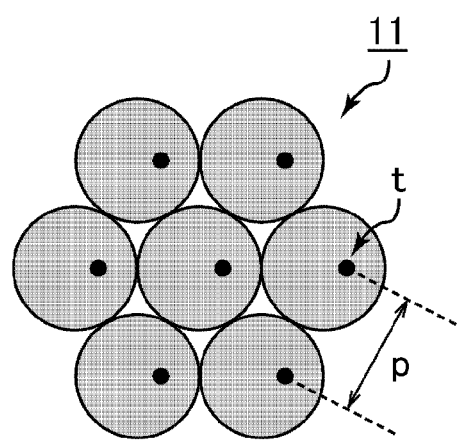

The expression "number density of inclined protrusions or sticking structures" herein means the number of inclined protrusions or sticking structures per $\mu m^2$.

The expression "inclination angle of an inclined protrusion" herein means the measure of an angle formed by a reference line and the normal line toward the main face of an optical film (substrate).

The term "reference line" herein means a straight line joining the center of the bottom (this may be the center of gravity of the bottom) of a protrusion and the tip of the protrusion.

The term "sticking structure" herein means a bundle of protrusions wherein tip portions of the protrusions are bent and linked to each other. Specific examples thereof include those in which not only the tip portions but also the whole of the protrusions including the tip portions are integrated and those in which only the tip portions are linked to each other and the inside thereof is hollow. The number of protrusions constituting the sticking structure is not particularly limited. Examples of the shape of the sticking structure in a plan view of an optical film include circle, ellipse, polygon, star, flower, and any indeterminate forms. In the case that each protrusion has a regular shape, the sticking structure is likely to have a shape of star, gourd, flower, or an indeterminate form.

The term "glass transition temperature (Tg)" herein is a temperature which gives the highest tan δ (loss tangent) in the measurement of temperature dependence (temperature variance) under the following conditions: a sample dynamic vibration rate (driving frequency) of 1 Hz, in the tensile mode, a chuck distance of 5 mm, and a temperature-rise rate of 2° C./min, in conformity of JIS K-7244. The Tg was measured using a dynamic viscoelasticity measurement device (DMS 6100, Seiko Instruments Inc.).

The present invention will be mentioned in more detail referring to the drawings in the following embodiments, but is not limited to these embodiments.

(Embodiment 1)

As shown in FIG. 1(a), an optical film (moth-eye film) 11 of the present embodiment has a moth-eye structure 14 formed on the surface of the film 11 and a base layer (base portion) 13. The moth-eye structure 14 includes multiple fine protrusions (protruding portions) 12. The protrusions 12 each are tapered toward the tip. The pitch (distance) between the apexes (top portions) of adjacent protrusions 12 is not greater than the visible light wavelength. In other words, the protrusions 12 are repeatedly arranged on the surface of the film 11 at a frequency of not greater than the visible light wavelength without any gap. Further, the base layer 13 is placed under the protrusions 12 (on the substrate side).

The substrate herein is a member to which the film 11 is to be attached. The substrate is preferably a member constituting the outermost face of a display device (preferably, liquid crystal display device). Specific examples thereof include polarizers, protecting plates made from a material such as acryl, hardcoat layers disposed on the surfaces of polarizers, and optical elements such as lenses.

Assuming that the apex of each protrusion 12 is t, the pitch p between adjacent apexes t is represented by the distance between the adjacent apexes t in a plan view of the main face of the film 11, as shown in FIG. 1(b). In addition, assuming that a point where protrusions 12 are in contact with each other is a bottom point b, the height h of each protrusion 12 is represented by the distance (shortest distance) from the apex t to the plane where the bottom point b exists.

The pitch p is not particularly limited as long as it is not greater than the visible light wavelength. The pitch p is preferably not greater than 400 nm, which is the lower limit of the common visible light wavelength range, more preferably not greater than 300 nm, and further preferably not greater than 200 nm, which is ½ of the lower limit of the visible light wavelength. If the pitch p is greater than 400 nm, light reflected by or passing through the film 11 may turn red (e.g. light with a wavelength of 700 nm). A pitch p of 300 nm or less enables to sufficiently suppress this effect, and a pitch p of 200 nm or less enables to almost perfectly prevent this effect.

The height h is not particularly limited as long as the antireflection effect is achieved. For example, the height h may be 100 to 400 nm. In order to suppress occurrence of a sticking phenomenon, and to prevent light reflected by or passing through the film 11 from turning blue, the height is preferably 300 nm or lower. On the other hand, in order to prevent light reflected by or passing through the film 11 from turning red, the height is preferably 150 nm or higher, and more preferably 200 nm or higher.

In the drawings of the present embodiment, the protrusions 12 are illustrated as circular-conical or oblique circular-conical protrusions. Here, the unit structure (shape) of each protrusion 12 is not particularly limited as long as the apex and the bottom point are formed and the pitch is controlled to be not greater than the visible light wavelength. For example, the protrusion 12 may have a shape in which its inclination becomes gentle from the apex to the bottom point (e.g. a bell shape and a dome shape); a shape in which its inclination becomes steep from the apex to the bottom point (e.g. a needle shape); or a shape in which the slope of the cone has stair-like steps.

In the present embodiment, the protrusions 12 are protrusions inclined to a direction oblique to the main face of the film 11 (inclined protrusions, directivity protrusions). In other words, the protrusions 12 (inclined protrusions) each have an oblique circular-cone shape, and they are inclined to the same or substantially the same direction in a plan view of the main face of the film 11.

As mentioned here, the directions of the protrusions 12 are controlled to directions other than the direction vertical to the main face of the film 11, and the protrusions 12 are inclined to desired directions.

As a result, light incident from a direction substantially parallel to the protrusions 12 is affected by the antireflection effect of the moth-eye structure 14. In other words, surface reflection can be effectively suppressed when the film 11 is observed from this direction.

In contrast, light incident from a direction substantially vertical to the protrusions 12 hits ridge portions of the protrusions 12, and thus is scattered. In other words, reflection of natural light, cloudy images (fuzzy with white color), unfocused images, glaring, and the like problems occur when the film 11 is observed from this direction.

As a result, reflection and scattering characteristics of light can be controlled depending on its incident direction, and directivity (anisotropy) can be given to the optical characteristics such as reflection and scattering of the film 11.

The mechanism that the optical characteristics of the film 11 show directivity may be considered as follows.

Figure 2:
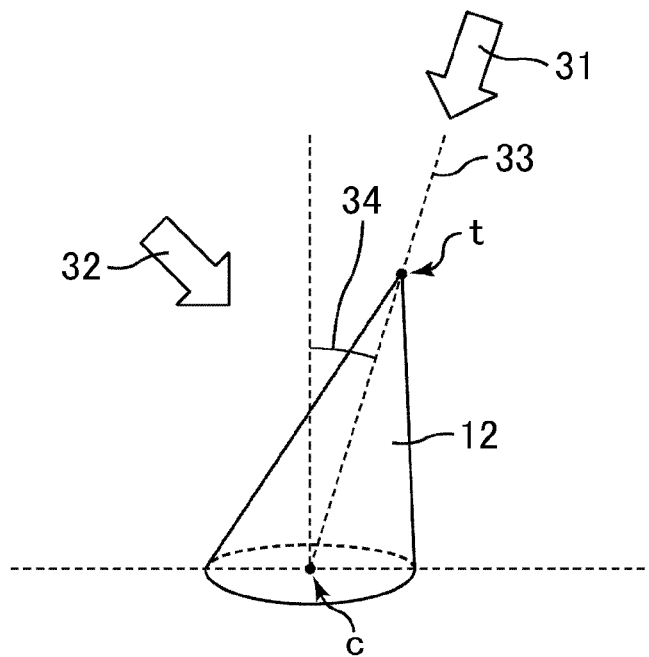
FIGS. 2(a) and 2(b) are schematic perspective views showing the optical film of Embodiment 1.
Figure 2:
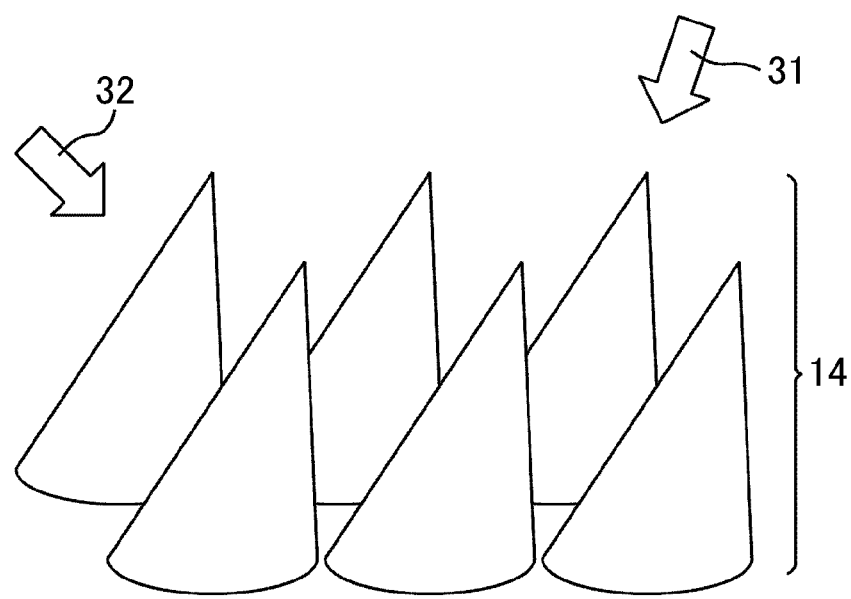

As shown in FIG. 2, light 31 (parallel-incident component) incident on the film 11 from a direction substantially parallel to the straight line (reference line 33) joining the center c of the bottom of a protrusion 12 (the bottom of the oblique circular cone herein) and the apex t thereof travels in the moth-eye structure 14 where the refractive index continuously varies. At this time, the refractive index at the interface between the air and the film 11 is considered to continuously and gradually increase from substantially 1.0 at the air layer to the refractive index (in the case of a resin, for example, substantially 1.5) of a constitutional material of the moth-eye structure 14. Thereby, the light 31 does not regard the interface between the air and the film 11 as resistance, and the interface where the light 31 is to be refracted can be (substantially) removed in a pseudo manner. This is because the amount of reflected light depends on the difference between the refractive indexes of the adjacent media. As a result, most part of the light 31 passes through the film 11, and the reflectivity on the surface of the film 11 greatly decreases. In other words, reflection of the light 31 is suppressed by the antireflection effect of the moth-eye structure 14, and the film 11 serves as a low-reflection film similar to a conventional moth-eye film against the light 31.

In contrast, light 32 (vertical-incident component) incident on the film 11 from a direction substantially vertical to the reference line 33 enters the ridge portion of the oblique circular cone. In other words, the light 32 can be considered to enter an ordinary surface (a face which is flat and has an refractive index different from that of the air layer), and the refractive index of the film 11 can be regarded as substantially constant in this direction. As a result, the film 11 has a weaker antireflection effect on the light 32 while the light 32 has a higher scattering characteristic.

In a conventional moth-eye film in which protrusions extend vertically to the film surface, light is considered to hardly enter the ridge portions of the protrusions. This is because each ridge portion is adjacent to a next protrusion. Therefore, in the conventional moth-eye film, only the light incident from substantially the normal direction on the main face of the film is considered to affect the optical characteristics.

In contrast, in the film 11, the protrusions 12 themselves are leveled down toward the horizontal direction and the ridge portions of the protrusions 12 are made to positively receive light. Thereby, directivity is given to the optical characteristics such as reflectivity and scattering characteristic.

As mentioned above, the protrusions 12 (inclined protrusions) inclined toward the main face of the film 11 serve as scattering factors for scattering light incident on the film 11. The amount of light scattered by the scattering factors (amount of scattered light) depends on the size of each inclined protrusion, the inclination angle 34 (an angle formed by the reference line 33 and the normal line to the main face of the film 11 (substrate)) of each inclined protrusion, and the number of the inclined protrusions per unit area.

Further, the inclined protrusions have a great influence on reflection of the light incident on the film 11, as mentioned above. In the case that the moth-eye structure 14 is made from a resin with a refractive index of 1.5 and light is applied thereto from the direction vertical to the protrusions 12, for example, common reflection (reflection at a reflectivity of substantially 4% which is calculated based on the air with a refractive index of 1.0 and a resin with a refractive index of 1.5) occurs. Thereby, the reflectivity varies depending on a viewing-angle direction although light may hardly enter the protrusions 12 from the perfectly vertical direction in actual situations.

The inclination angle of each protrusion 12 can be appropriately set depending on the intensity of the scattering characteristic, the direction of exerting the scattering characteristic, the application of the film 11, and the like. Further, a larger inclination angle of each protrusion 12 causes a greater directivity of the optical characteristics of the film 11 and a more oblique directivity of the optical characteristics of the film 11. As mentioned here, the inclination angle is preferably higher in order to use the film 11 for devices which require a better controlled viewing angle.

Figure 3:
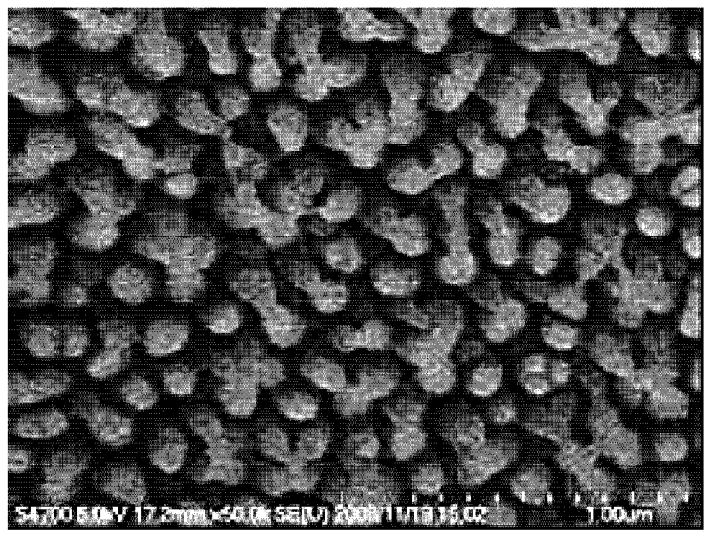
FIG. 3 is an SEM photograph (overhead view) of a moth-eye film on which a sticking phenomenon occurs.
Figure 4:
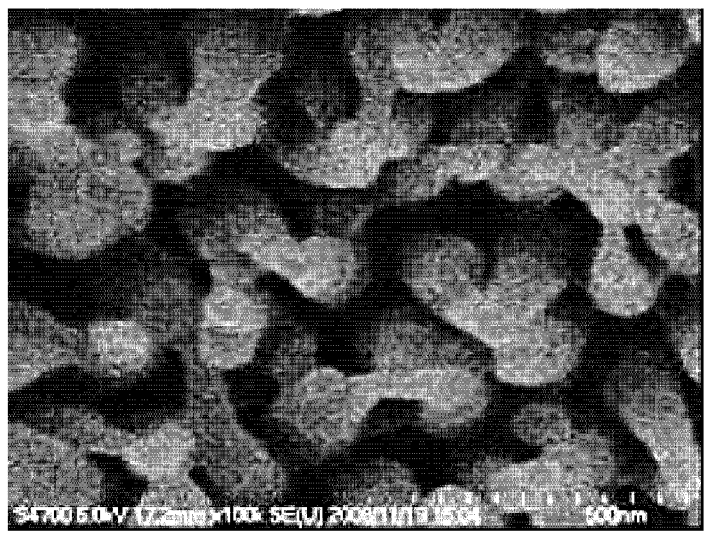
FIG. 4 is another SEM photograph (overhead view) of a moth-eye film on which a sticking phenomenon occurs.

In order to give marked directivity to the optical characteristics, the inclination angle of each protrusion 12 is preferably 20° or higher, more preferably 30° or higher, and further preferably 45° or higher. If the inclination angle is 45° or higher, however, several adjacent protrusions may link (be close) to each other (this i called a sticking phenomenon), as shown in FIGS. 3 and 4. In this case, the moth-eye structure is as if having a wide pitch, and the scattering characteristic of the light 31 (parallel-incident component) may be disadvantageously high.

As mentioned above, the inclined protrusions do not include protrusions forming a sticking structure (a structure formed by linking of the tips of multiple protrusions). Further, the inclined protrusions each individually lean to a certain direction.

The application of the film 11 is not particularly limited. Since the optical characteristics of the film 11 show directivity, the film is suitably used as an antipeep sheet (privacy sheet) for devices whose displays are viewed mainly from a specific direction, such as mobile phones, PDAs, ATMs (automated-teller machines), personal computers, and car navigation systems.

The method for producing the film 11 will be mentioned referring to examples where a moth-eye film was actually produced.

EXAMPLE 1

First, a 10-cm square glass substrate was prepared, and aluminum (Al), a material of a mold, was deposited to a thickness of 1.0 μm on the glass substrate by sputtering. Next, the aluminum was anodized, and then immediately etched. These operations were repeated, and thereby an anodized layer with a large number of fine holes was produced. Specifically, the mold was produced through a process including, in this order, a first anodization, first etching, second anodization, second etching, third anodization, third etching, fourth anodization, fourth etching, and fifth anodization (5 anodizing operations and four etching operations). Such a process of repeating anodization and etching gives a taper shape toward the inside of a mold to each of the formed fine holes. In addition, the distance between the bottom points of adjacent holes is not greater than the visible light wavelength.

The respective anodizing operations were performed under the following conditions: 0.6 wt % oxalic acid, liquid temperature of 5° C., and an applied voltage of 80 V. The size of each hole to be formed can be controlled by controlling anodization duration. As the anodization duration increases, the depth of each hole increases and the size of each hole increases. The anodization duration was 25 seconds in the present example.

The respective etching operations were performed under the following conditions: 1 mol/l phosphoric acid, liquid temperature of 30° C., and 25 minutes.

A liquid 2P (photo-polymerizable) resin was dripped on the mold with the holes formed thereon, and a TAC film was attached onto the 2P resin so as not to contain air bubbles therebetween. The TAC film serves as a base layer 13 (substrate film). Next, the 2P resin was irradiated with ultraviolet (UV) rays at 2 J/cm$^2$ so that the 2P resin was cured. Then, a laminate of the solid 2P resin and the TAC film was peeled off from the mold. Thereby, conical protrusions were printed on the 2P resin.

As mentioned above, the material for forming the moth-eye structure on the film 11 is preferably a resin curable by energy lines including electromagnetic waves such as ultraviolet rays and visible light. In the present example, a UV-curable resin was used in order to suppress an influence of heat on the production process. Examples of the influence of heat include changes in printing characteristics due to thermal expansion of resin and damages on the mold by heat. On the other hand, the moth-eye structure may be formed by thermosetting treatment using a thermosetting resin.

If an inorganic resin is used as a material of the moth-eye structure, the resin may not be peeled off from the mold upon printing of the protrusions. Further, inorganic resins are harder than organic resins, and they tend to be poor in mechanical properties. For example, a film 11 made of an inorganic resin is likely to be poor in durability against rubbing by a finger or steel wool on its surface. Therefore, an organic resin is suitable for the present embodiment including a rubbing step.

Finally, the surfaces of the conical protrusions were rubbed in a certain direction with a uniform pressure applied thereto and the directions of the conical protrusions were controlled. Thereby, a film 11 was produced. This rubbing step made the conical protrusions incline into an oblique circular cone state, and the protrusions 12 were formed. The optical characteristics of the film 11 showed directivity in a predetermined direction. The rubbing treatment was performed using a rubbing device generally used for rubbing alignment layers for liquid crystal display panels, and the pressing pressure upon rubbing (the pressure of a rubbing roller on the moth-eye structure of the film 11) was set to 290 kPa (3.0 kgw/cm$^2$).

Figure 5:
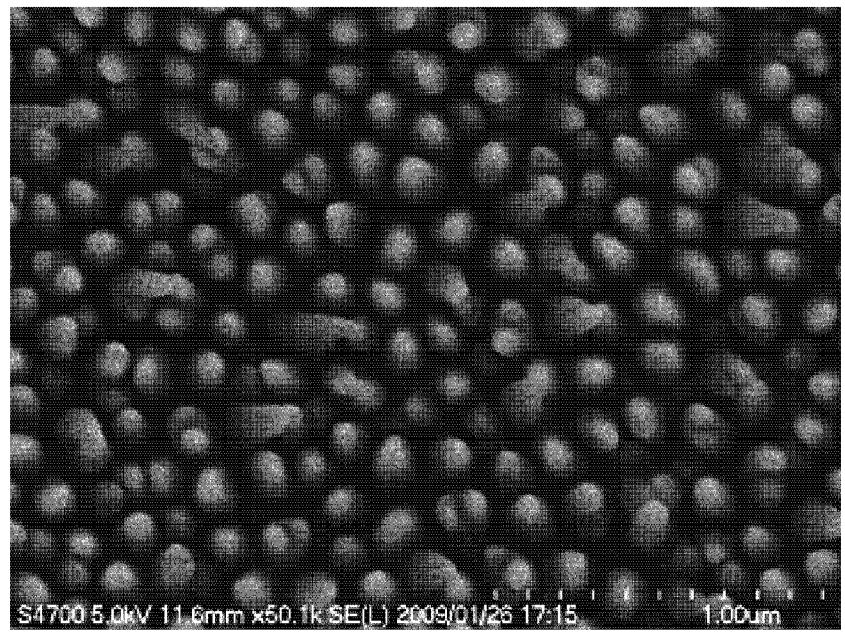
FIG. 5 is an SEM photograph (overhead view) of a conventional moth-eye film.
Figure 6:
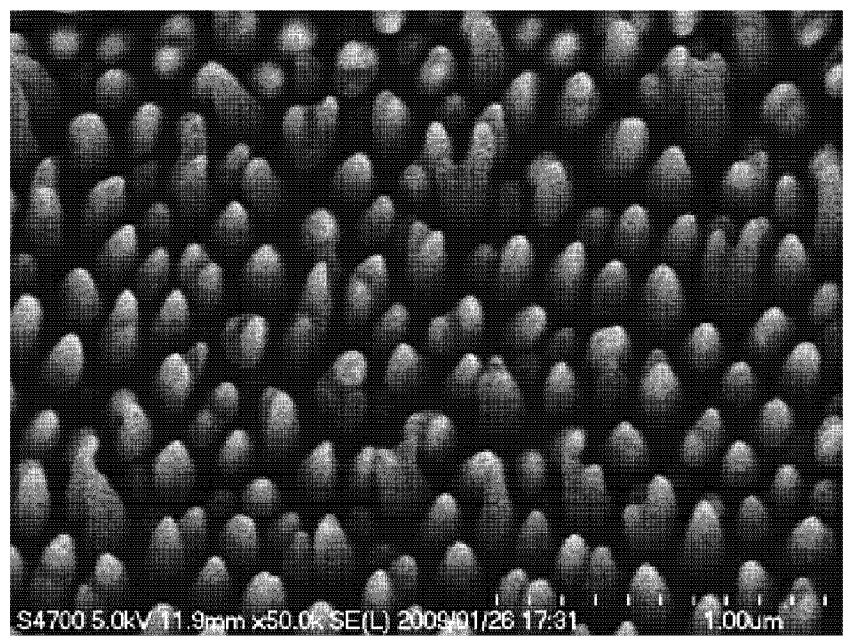
FIG. 6 is an SEM photograph (overhead view) of an optical film of Example 1.
Figure 7:
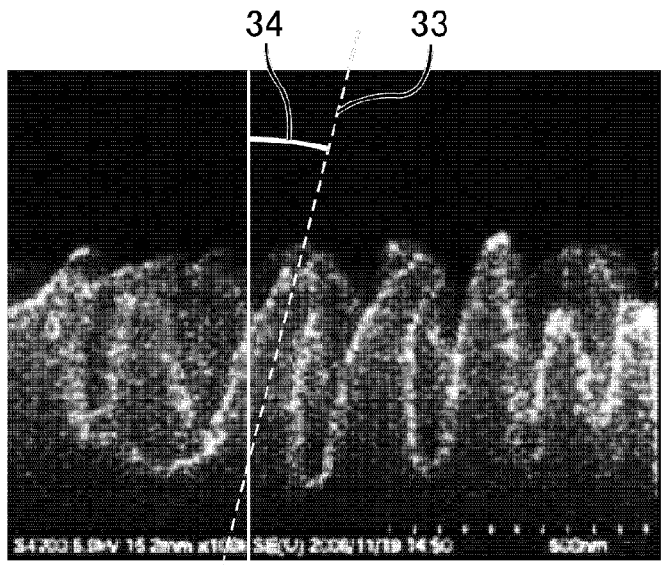
FIG. 7 is an SEM photograph (cross-sectional view) of the optical film of Example 1.

FIG. 5 is an SEM photograph (overhead view) of a conventional moth-eye film, and FIGS. 6 and 7 are SEM photographs (overhead view and cross-sectional view) of the optical film of Example 1.

As shown in FIG. 5, most of protrusions are formed toward the right above direction of the main face of the film in the conventional moth-eye film.

In contrast, as shown in FIG. 6, the protrusions 12 are made to incline in a substantially certain direction by the rubbing treatment on the optical film 11 of Example 1. Thereby, directivity is given to the reflectivity and scattering characteristic of the film 11.

Variations in the inclination directions of the protrusions 12 were within 20° in a plan view of the main face of the film 11. Further, as shown in FIG. 7, the inclination angles of the protrusions 12 were substantially 17° in Example 1. In addition, the pitch p of the protrusions 12 was 180 nm and the height h of the protrusions 12 was 373 nm.

Figure 8:
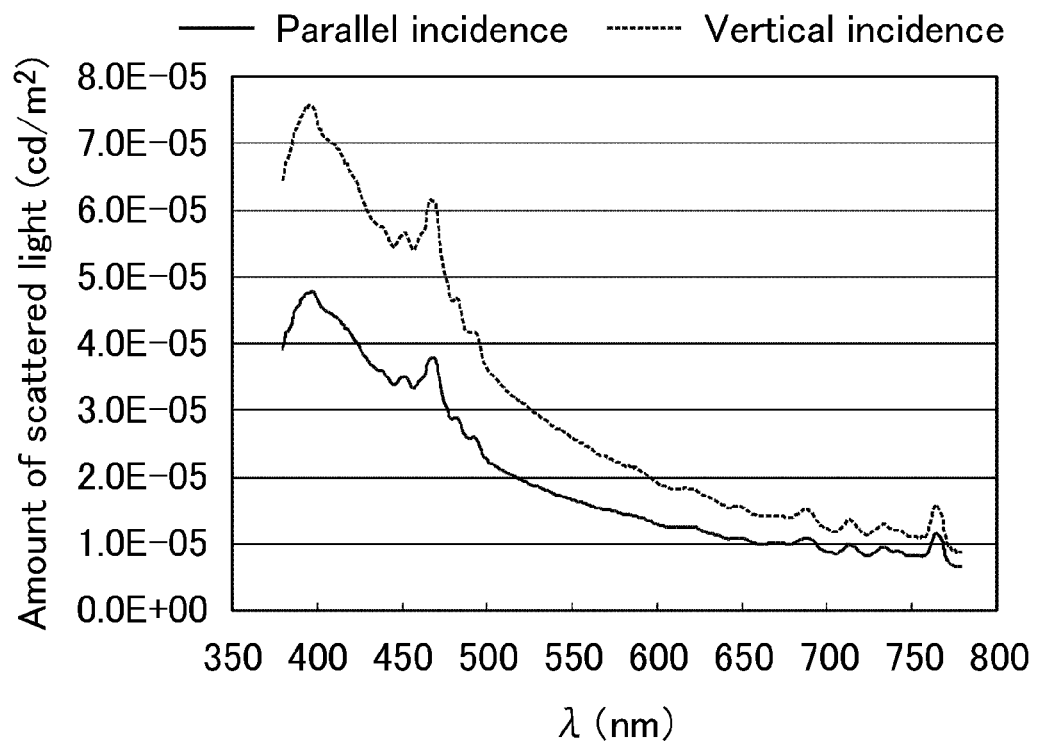
FIG. 8 shows the scattering spectrum of the optical film of Example 1.
Figure 9:
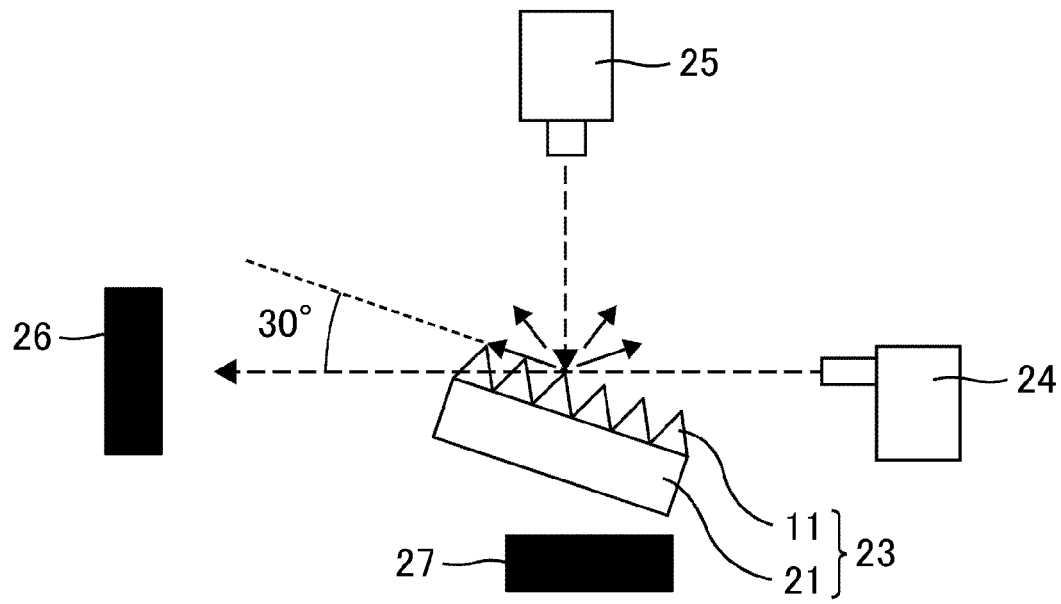
FIG. 9 is a schematic diagram showing an evaluation system for measuring scattering spectrum.

FIG. 8 shows the results of measuring the scattering spectrum of the optical film 11 of Example 1. FIG. 9 is a schematic diagram showing an evaluation system for measuring the scattering spectrum.

As shown in FIG. 9, a subject 23 is a laminate of a transparent glass plate 21 and a moth-eye film (film 11) disposed on the transparent glass plate 21. In the measurement, a light source 24 was placed on the front side of the film 11 (the side with protrusions) so as to form an angle of 30° with the main face of the film 11, and light was applied to the front face of the film 11 from the direction of 30°.

When the main face of the film is observed from a direction of substantially 30° under a common fluorescent lamp, the scattering intensity of the optical film is highest, that is, the main face of the film is most cloudy. The measurement system shown in FIG. 9 reflects this experimental result. Thereby, the result wherein the scattering intensity is most reflected can be obtained.

The measurement angle of the film 11 is not limited to 30°, and may be appropriately set except 45°. Experiments show that if light is applied to the surface of the film 11 from the direction of 45°, the regular reflection component of light from the light source is directly received by a luminance meter 25 and the scattering characteristic is not measured.

A black absorber 26 was placed at a site on the forward movement direction of the light, opposite to the light source 24 about the film 11, and facing the direction of movement of light. Further, a luminance meter 25 and an absorber 27 were placed on the direction orthogonal to the light source 24 and the black absorber 26, that is, the direction of 60° to the main face of the film 11 and the direction orthogonal to the direction of movement of light. In other words, the luminance meter 25 and the absorber 27 were placed opposite to each other about the film 11, and the measurement direction of the luminance meter 25 and the absorber 27 face to each other. The luminance meter 25 was placed on the front side of the film 11, and the absorber 27 was placed on the back side of the film 11.

The absorber 26 absorbs light components (transmitted light) transmitted through the film 11, which are part of the light incident on the film 11 except the scattered components. Further, the absorbers 26 and 27 absorb components scattered on the back side of the moth-eye film 22 among the light scattered on the surface of the film 11 except the components scattered on the front side of the film 11.

The luminance meter 25 used here was SR-UL1 (TOPCON TECHNOHOUSE CORPORATION). The measurement conditions were as follows: measurement angle of 2.0° visual field and a distance to the subject 23 of 40 cm. Since the absorbers 26 and 27 absorb the light heading to the back side of the film 11, such a measurement system can measure the amount of light (amount of reflected and scattered light) scattered on the surface of the film 11 and heads to the front side of the film 11.

The light source 24 used was a xenon lamp (MC-961C, Otsuka Electronics Co., Ltd.). The luminous intensity around the surface of the film 11 was 3000 Lx, and the distance between the light source 24 and the subject 23 was 15 cm.

The graph indicated as parallel incidence in FIG. 8 shows the measurement result in the case that the subject 23 was placed such that the protrusions 12 face the light source 24. In contrast, the graph indicated as vertical incidence in FIG. 8 shows the measurement result in the case that the subject 23 was placed such that the protrusions 12 face the side opposite to the light source 24.

Examples of a method for specifying the inclination directions of the protrusions 12 include a method of observing the cross section of the film 11 by SEM, and a method of measuring the reflectivity and scattering characteristic from various azimuths and thus measuring the azimuth dependence of the reflectivity and scattering characteristic.

As shown in FIG. 8, the measurement showed that, in the case that the protrusions 12 faced the light source 24, the amount of scattered light was small in a short wavelength region, and the light from the light source 24 was less scattered (scattering characteristic was low). In other words, the measurement showed that reflection of light on the surface of the film 11 was suppressed in this state, and the light scattering characteristic was low; thus, the film 11 functioned as a low-reflection film similar to a conventional moth-eye film.

On the other hand, the measurement showed that, in the case that the protrusions 12 faced the side opposite to the light source 24, the scattering intensity was high in a short wavelength region, and the light from the light source 24 was scattered (scattering characteristic was high). This is presumably because the light from the light source 24 was incident on the ridge portions of the protrusions 12 in this state, and thus the antireflection effect of the moth-eye structure with a continuously varying refractive index was not exerted.

Figure 10:
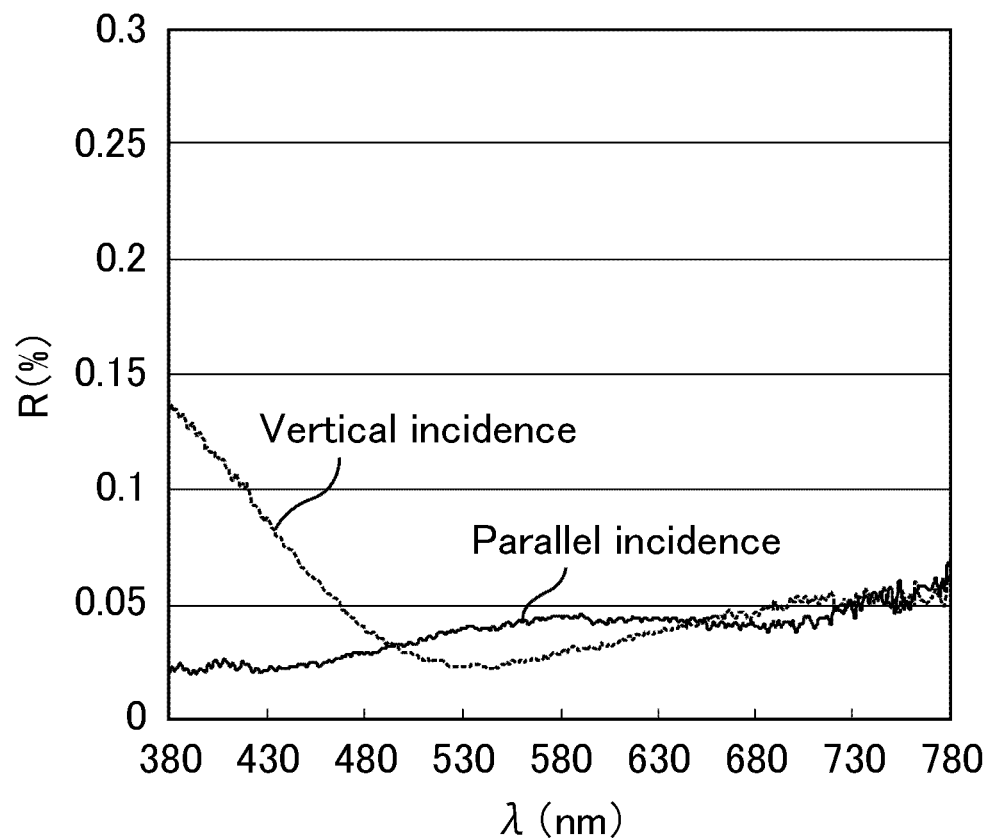
FIG. 10 shows the reflectivity of the optical film of Example 1.

Next, FIG. 10 shows the result of measuring the reflectivity of the optical film 11 of Example 1. The reflectivity R was measured using a UV-visible spectrophotometer (JASCO Corporation, V-560) in a state that the film 11 was attached to a black acryl plate. The acceptance angle of a light-receiving unit was set to 5° in this spectrophotometer and only the regular reflection components within 5° were measured.

As a result, as shown in FIG. 10, the measurement showed that the reflectivity of the light incident on the film 11 from a direction substantially parallel to the reference line 33 (light indicated as parallel incidence in FIG. 10) was effectively reduced in the entire visible light region.

In contrast, the measurement showed that the reflectivity of the light incident on the film 11 from a direction substantially vertical to the reference line 33 (light indicated as vertical incidence in FIG. 10) increased in a short wavelength region. This is presumably because of the influence of light scattering in a short wavelength region.

Next, the method for controlling the directivity of the optical characteristics was described referring to Examples 2 and 3 and Comparative Example 1.

COMPARATIVE EXAMPLE 1

Except that the pressing pressure upon rubbing was changed to 50 kPa (0.5 kgw/cm$^2$), an optical film of Comparative Example 1 was produced in the same manner as in Example 1.

EXAMPLE 2

Except that the pressing pressure upon rubbing was changed to 100 kPa (1.0 kgw/cm$^2$), an optical film of Example 2 was produced in the same manner as in Example 1.

EXAMPLE 3

Except that the pressing pressure upon rubbing was changed to 150 kPa (1.5 kgw/cm$^2$), an optical film of Example 3 was produced in the same manner as in Example 1.

Figure 11:
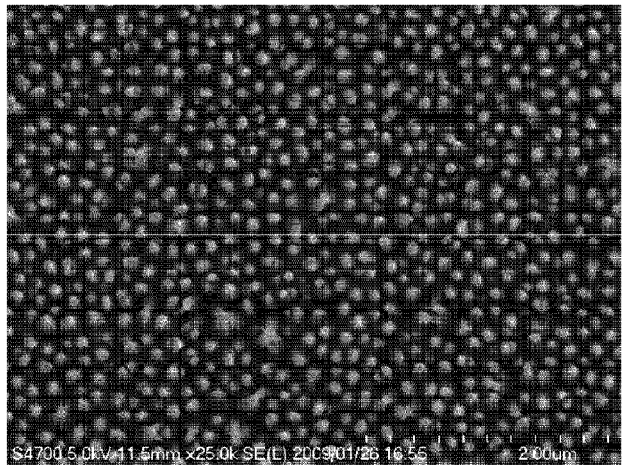
FIG. 11 is an SEM photograph (overhead view) of an optical film of Comparative Example 1.
Figure 12:
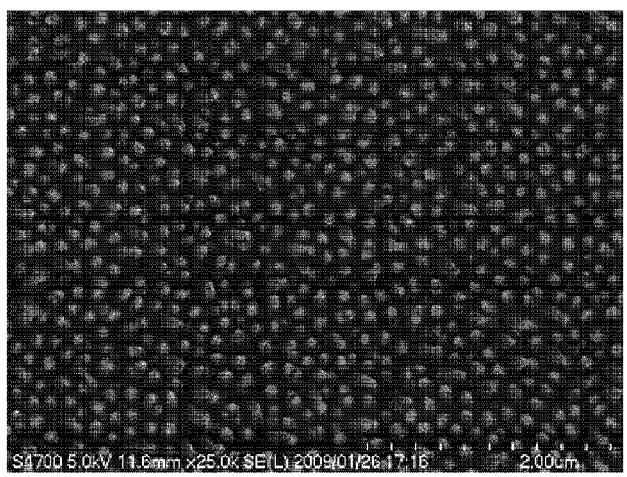
FIG. 12 is an SEM photograph (overhead view) of an optical film of Example 2.
Figure 13:
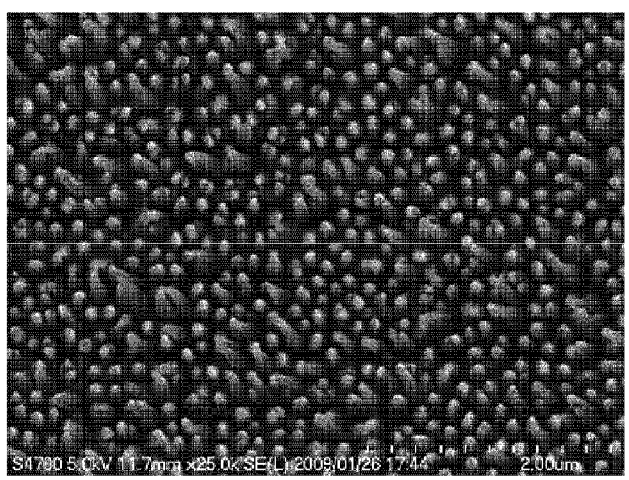
FIG. 13 is an SEM photograph (overhead view) of an optical film of Example 3.

The number density of the inclined protrusions was measured using an SEM photograph (overhead view) shown in FIGS. 11 to 13 in Comparative Example 1 and Examples 2 and 3, respectively. Specifically, the number of the inclined protrusions was counted within the SEM measurement area of 20 μm$^2$ (at the magnification providing an about 4 μm×5 μm SEM image), and this number was divided by the measurement area. The measurement was performed using FE-SEM (S4700, Hitachi High-Technologies Corporation).

As a result, in Comparative Example 1, the number density of the inclined protrusions was 0.05 pcs/μm$^2$; inclined protrusions were hardly observed, and the optical characteristics of the film showed no directivity.

On the other hand, in Example 2, the number density of the inclined protrusions was 0.87 pcs/μm$^2$, and in Example 3, the number density of the inclined protrusions was 2.45 pcs/μm$^2$. Further, in Examples 2 and 3, the optical characteristics of the film showed directivity.

As mentioned above, not all of the protrusions 12 are required to be inclined. Part of the protrusions 12 may be inclined and the rest of the protrusions 12 may be substantially vertical to the main face of the film 11.

In order to securely give directivity to the optical characteristics of the film 11, the number density of the inclined protrusions was preferably 0.5 pcs/μm$^2$ or more, more preferably 0.7 pcs/μm$^2$ or more, further preferably 0.8 pcs/μm$^2$ or more, and particularly preferably 0.85 pcs/μm$^2$ or more, based on the results in Comparative Example 1 and Examples 2 and 3.

In addition, the number density of the sticking structures was measured using the SEM photograph (overhead view) shown in FIGS. 11 to 13 in Comparative Example 1 and Examples 2 and 3, respectively. The measurement was performed in the same manner as in the method of measuring the number density of the inclined protrusions.

As a result, in Comparative Example 1, the number density of the sticking structures was 0.41 pcs/μm$^2$; in Example 2, the number density of the sticking structures was 0.26 pcs/μm²; and in Example 3, the number density of the sticking structures was 0.20 pcs/μm².

As mentioned above, application of a pressing pressure which can provide directivity reduces the number of the sticking structures. This is presumably because the sticking structures are separated by the stress due to the pressing pressure.

In order to securely give directivity to the optical characteristics of the film 11, the number density of the sticking structures is preferably 0.40 pcs/μm² or less, more preferably 0.35 pcs/μm² or less, further preferably 0.30 pcs/μm² or less, and particularly preferably 0.26 pcs/μm² or less, based on the results of Comparative Example 1 and Examples 2 and 3. If the number density thereof is more than 0.40 pcs/μm², directivity may not be given to the optical characteristics of the optical film of the present invention.

If the number density of the sticking structures is 2.1 pcs/μm² or more, the optical characteristics show no directivity, and the film may be cloudy when observed from any direction.

Each of the sticking structures had a star shape which radially extends from the center, a gourd or flower shape which consists of circles or ellipses overlapping with each other, or an indeterminate form without regularity, in a plan view of the main face of the film 11.

Variations in the inclination directions of the inclined protrusions were within 30° in Example 2 and within 30° in Example 3, in a plan view of the main face of the film 11.

Next, the relationship between the expression of directivity (inclined protrusions) and the moth-eye structure will be described.

Figure 14:
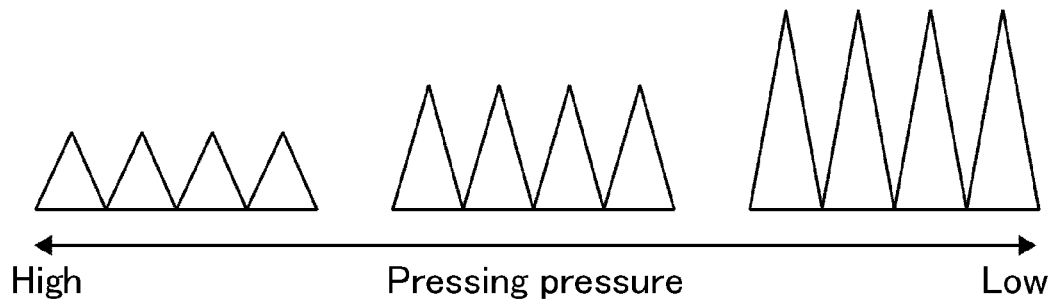
FIG. 14 is a schematic view for describing the relationship between the expression of directivity (inclined protrusions) and the height of the protrusions.

Assuming that the pitch of fine holes formed on the mold, in other words, the pitch p of the protrusions, is fixed (for example, pitch=180 nm), the height h of the protrusions satisfies the following relationship as shown in FIG. 14; that is, the higher the height h is, the lower the pressing pressure upon rubbing is for giving oblique directivity to the protrusions.

Figure 15:
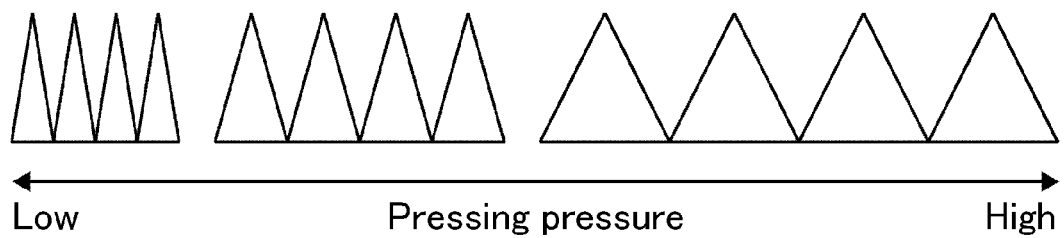
FIG. 15 is a schematic view for describing the relationship between the expression of directivity (inclined protrusions) and the pitch of the protrusions.

Assuming that the depth of the fine holes formed on the mold is fixed (for example, depth=400 nm), the pitch p of the protrusions satisfies the following relationship as shown in FIG. 15; that is, the greater the pitch p is, the higher the pressing pressure upon rubbing is for giving oblique directivity to the protrusions.

The printing ratio of the depth of the fine holes to a resin material is substantially 60%. If the depth of the fine holes is 400 nm, the height h of the protrusions is substantially 240 nm.

The following will describe the results of examining the relationship between achievement of directivity (inclined protrusions) and the moth-eye structure with actually produced films.

EXAMPLE 4

Except that the pitch of the conical protrusions was 100 nm, the height of the conical protrusions was 200 nm, and the pressing pressure upon rubbing was changed, an optical film of Example 4 was produced in the same manner as in Example 1.

EXAMPLE 5

Except that the pitch p of the protrusions was 200 nm, the height h of the protrusions before the rubbing was 200 nm, and the pressing pressure upon rubbing was changed, an optical film of Example 5 was produced in the same manner as in Example 1.

EXAMPLE 6

Except that the pitch p of the protrusions was 200 nm, the height h of the protrusions before the rubbing was 200 nm, and the pressing pressure upon rubbing was changed, an optical film of Example 6 was produced in the same manner as in Example 1.

EXAMPLE 7

Except that the pitch p of the protrusions was 200 nm, the height h of the protrusions before the rubbing was 300 nm, and the pressing pressure upon rubbing was changed, an optical film of Example 7 was produced in the same manner as in Example 1.

EXAMPLE 8

Except that the pitch p of the protrusions was 200 nm, the height h of the protrusions before the rubbing was 300 nm, and the pressing pressure upon rubbing was changed, an optical film of Example 8 was produced in the same manner as in Example 1.

EXAMPLE 9

Except that the pitch p of the protrusions was 200 nm, the height h of the protrusions before the rubbing was 400 nm, and the pressing pressure upon rubbing was changed, an optical film of Example 9 was produced in the same manner as in Example 1.

EXAMPLE 10

Except that the pitch p of the protrusions was 200 nm, the height h of the protrusions before the rubbing was 400 nm, and the pressing pressure upon rubbing was changed, an optical film of Example 10 was produced in the same manner as in Example 1.

Table 1 shows the results of evaluating the relationship between the pressing pressure upon rubbing and the pitch p and the height h of the protrusions. Each of the pressing pressures in Table 1 is the lower limit of the pressing pressure for giving oblique directivity to the protrusions, and its unit is kgw/cm².

TABLE 1

|  |  | Pitch p (nm) | | |
| --- | --- | --- | --- | --- |
|  |  | 100 | 200 | 400 |
| Height h (nm) | 100 | — | — | — |
|  | 200 | 1.0 | 1.0 | 3.0 or higher |
|  | 300 | — | 1.0 | 3.0 or higher |
|  | 400 | — | 0.5 | 2.5 |

In the ranges where the height h is 100 nm or lower and where the pitch p is greater than 400 nm, the moth-eye structure has a poor antiglare effect and is less useful. Thus, the evaluation was not performed.

These results show that the pressing pressure is required to be higher as the pitch p becomes greater and that the pressing pressure may be lower as the height h is higher in order to give directivity to the protrusions.

The following will describe the results of evaluating the relationship between the pressing pressure upon rubbing and the glass transition temperature (Tg) of the resin material with actually produced films having different Tg values.

EXAMPLE 11

Except that a moth-eye structure was produced using a mold and a material (resin A) different from those in Example 1 and the pressing pressure upon rubbing was changed, an optical film of Example 11 was produced in the same manner as in Example 1.

EXAMPLE 12

Except that a moth-eye structure was produced using a mold and a material (resin B) different from those in Example 1 and the pressing pressure upon rubbing was changed, an optical film of Example 12 was produced in the same manner as in Example 1.

EXAMPLE 13

Except that a moth-eye structure was produced using a mold and a material (resin C) different from those in Example 1 and the pressing pressure upon rubbing was changed, an optical film of Example 13 was produced in the same manner as in Example 1.

EXAMPLE 14

Except that a moth-eye structure was produced using a mold and a material (resin D) different from those in Example 1 and the pressing pressure upon rubbing was changed, an optical film of Example 14 was produced in the same manner as in Example 1.

The resins A to D are similar in that they each are a UV-curable acrylate monomer or oligomer (KAYARAD Series, Nippon Kayaku Co., Ltd.), but they have different physical properties such as Tg. The resin A did not show a definite Tg value. The Tg of the resin B was 48° C., the Tg of the resin C was 65° C., and the Tg of the resin D was 84° C.

The pitch of the fine holes formed on the mold used in Examples 11 to 14 was 200 nm, and the depth thereof was 520 nm. In other words, the pitch p of the protrusions in Examples 11 to 14 was also 200 nm. Further, the height h of the protrusions before rubbing in Examples 11 to 14 was 255 nm.

As mentioned above, the holes on the mold used here were deep, and the printed protrusions 12 were high. Therefore, the protrusions are presumably likely to be affected by the pressing pressure and, in the case of a hard material, directivity is less likely to be exerted.

Table 2 shows the results. Each of the pressing pressures in Table 2 indicates the lower limit of the pressing pressure for giving oblique directivity to the protrusions, and its unit is kgw/cm$^2$.

TABLE 2

|  | Resin A | Resin B | Resin C | Resin D |
| --- | --- | --- | --- | --- |
| Tg (° C.) | No definite Tg | 48 | 65 | 84 |
| Pressing pressure (kgw/cm$^2$) | 3.0 or higher | 0.5 | 2 | 3.0 or higher |

Table 2 shows that the lower the Tg of a resin is, the more easily the oblique directivity is given to the protrusions, and the higher the Tg is, the higher the pressing pressure upon rubbing tends to be for giving oblique directivity to the protrusions.

Further, Table 2 shows that a pressing pressure of 0.5 kgw/cm$^2$ (50 kPa) or higher can securely give directivity to the moth-eye structure which is made of a material having a Tg of 48° C. or lower and whose protrusions have a pitch p of 200 nm or less and a height h before rubbing of 255 nm or higher.

In addition, Table 2 shows that a pressing pressure of 2.0 kgw/cm$^2$ (200 kPa) or higher can securely give directivity to the moth-eye structure which is made of a material having a Tg of 65° C. or lower and whose protrusions have a pitch p of 200 nm or less and a height h before rubbing of 255 nm or higher.

Furthermore, Table 2 shows that a pressing pressure of 3.0 kgw/cm$^2$ (290 kPa) or higher can securely give directivity to the moth-eye structure which is made of a material having a Tg of 84° C. or lower and whose protrusions have a pitch p of 200 nm or less and a height h before rubbing of 255 nm or higher.

If a hard resin was used, specifically, the resin A or the resin D was used, the protrusions were folded through multiple rubbing treatments, in some cases.

In general, a UV-curable resin having more active points for polymerization tends to have a higher cross-linking density after polymerization, to have a higher Tg, and to provide a harder cured product.

(Embodiment 2)

The optical film of the present embodiment has the same structure as the optical film of Embodiment 1 except that the protrusions of the moth-eye structure are arranged in a different manner. Thus, the following will describe only the respects different from those in Embodiment 1 in detail. Further, the members having the same effects as in Embodiment 1 are described using the same reference numerals.

As shown in FIG. 16(a), the main face of the optical film 11 of the present embodiment is divided into two regions 15 and 16 like the digital (seven-segment) figure "8". The protrusions 12 in the region 15 and those in the region 16 are inclined to different directions. As shown in FIGS. 16(a) and 16(b), the protrusions 12 (protrusions 12L) in the left region 15 are inclined toward the right side, in other words, toward the center line 35 which is the borderline between the regions 15 and 16, in a front view of the film 11. In contrast, as shown in FIGS. 16(a) and 16(c), the protrusions 12 (protrusions 12R) in the right region 16 are inclined toward the left side, in other words, toward the center line 35, in the front view of the film 11. As mentioned here, the protrusions 12L and 12R are inclined toward the inside of the film 11 in a plan view of the main face of the film 11.

Thus, the protrusions 12L and 12R are inclined toward an observer viewing the film 11 from the front direction. As a result, the film 11 serves as an antireflection film for an observer viewing the film 11 from the front direction. On the other hand, an observer viewing the film 11 from left or right views the ridge portions of the protrusions 12L and 12R. As a result, in this case, the scattering characteristic of light on the surface of the film 11 is high.

In the present embodiment, the protrusions 12 at a peripheral portion of the film 11 (preferably, a peripheral portion of a display) are inclined to the inside of the film 11 in a plan view of the main face of the film 11. In other words, the apex of each protrusion 12 is at an inner portion of the film 11 (preferably, the display) compared with the center of the bottom thereof. Thus, the optical film 11 of the present embodiment is suitable as an antipeep sheet for devices whose displays are mainly observed from the front direction. Examples of such devices include portable devices such as mobile phones and PDAs, ATMs (automated-teller machine), and laptop computers. The present embodiment is also suitable as an antipeep sheet for desktop computers displaying top secret information.

As shown in FIG. 17(a), the main face of the optical film 11 of the present embodiment may be divided into three regions 15, 16 and 17 like a tricolor (such as the national flag of France). The protrusions 12 in the left region 15 and those in the right region 16 are inclined to opposite directions (both toward the inside of the film 11) in the same manner as in the case shown in FIG. 16. On the other hand, the protrusions 12 in the central region 17 are vertical to the main face of the film 11, as shown in FIG. 17(b).

Thereby, the present embodiment can be suitably used as an antipeep sheet for devices mainly observed from the front direction.

Figure 16:
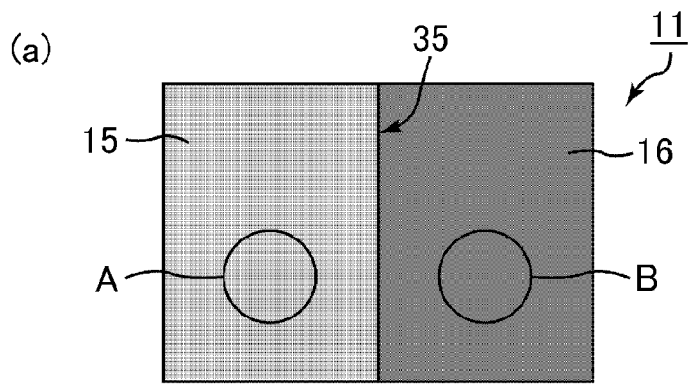
FIGS. 16(a) to 16(c) are schematic views showing an optical film of Embodiment 2.
Figure 16:
Figure 16:
Figure 17:
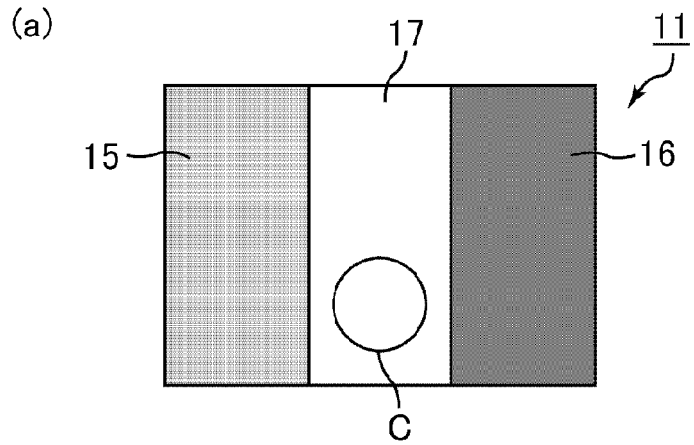
FIGS. 17(a) and 17(b) are schematic views showing the optical film of Embodiment 2.
Figure 17:
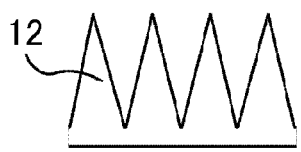

In order to incline the protrusions 12 to different directions in the same main face as shown in FIGS. 16 and 17, the main face of the film 11 is rubbed in multiple directions.

Each of the divided regions may be individually provided with a display and a film 11. Thereby, the present embodiment can be applied to a large display consisting of multiple displays such as an information display. Further, the present embodiment can improve the viewing angle characteristic of a large display in a front direction.

As mentioned above, the optical films 11 of Embodiments 1 and 2 can have optical characteristics such as reflection and scattering with directivity while having a moth-eye structure.

Further, in Embodiments 1 and 2, the scattering characteristic of the film 11 can be controlled upon image displaying. As mentioned here, in Embodiments 1 and 2, the film 11 is not given a random scattering characteristic and the protrusions of the moth-eye structure are precisely arranged (aligned) in the rubbing direction. As a result, the scattering direction can be controlled.

Figure 18:
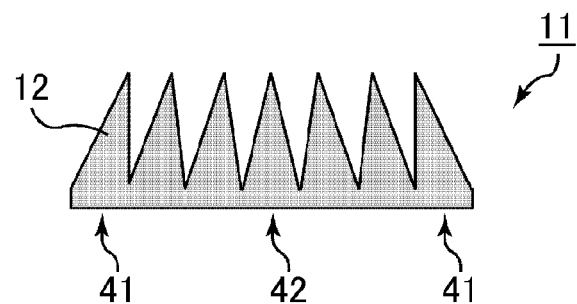
FIG. 18 is a schematic cross-sectional view showing the optical film of Embodiment 2.

In Embodiments 1 and 2, the inclination angles of the inclined protrusions are not necessarily the same in the main face of the film 11, and may be different in the main face of the film 11. As shown in FIG. 18, for example, the inclination angles of the protrusions 12 may be gradually lowered from the peripheral portion 41 to the central portion 42 of the film 11.

In such a case, the inclined protrusions are more securely inclined to an observer viewing the film 11 from the front direction. Therefore, the visibility of the film 11, that is, an article observed through the film 11 (e.g. a display), when the film 11 is observed from the front direction, can be improved.

Figure 19:
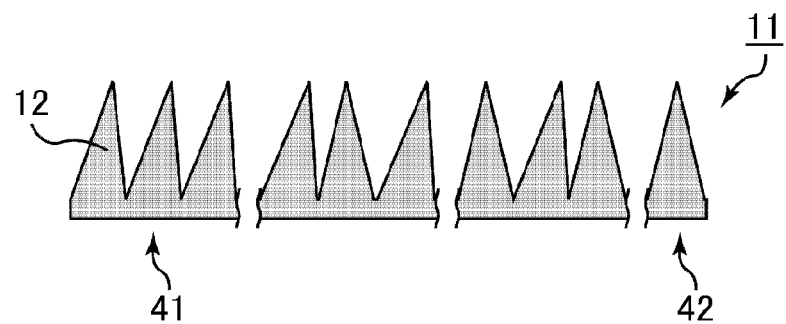
FIG. 19 is a schematic cross-sectional view showing the optical film of Embodiment 2.
Figure 20:
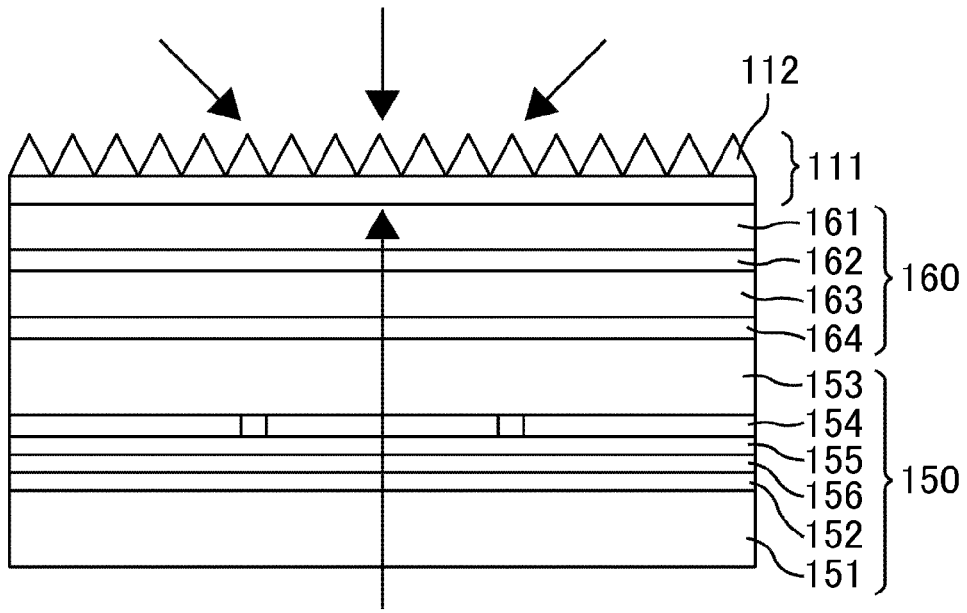
FIG. 20 is a schematic cross-sectional view showing a liquid crystal display device with a conventional moth-eye film which has a moth-eye structure attached thereon.
Figure 21:
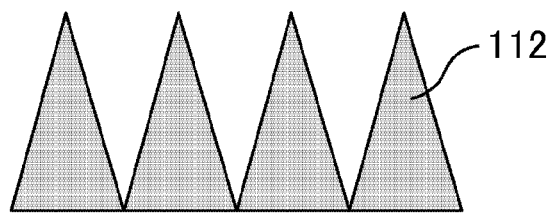
FIGS. 21(a) and 21(b) are schematic views showing a conventional moth-eye film.
Figure 21:
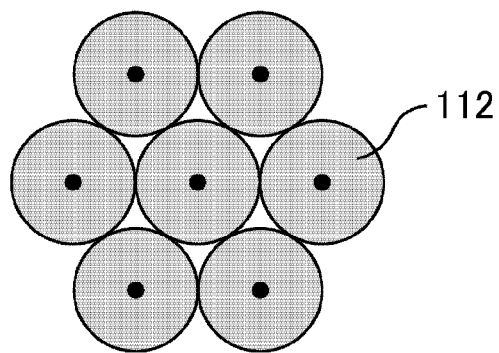

In addition, in Embodiments 1 and 2, the number density of the inclined protrusions is not necessarily constant in the main face of the film 11, and may vary in the main face of the film 11. As shown in FIG. 19, for example, the number density of the protrusions 12 may be gradually reduced from the peripheral portion 41 to the central portion 42 of the film 11.

In this case, the film 11 can more securely exert the antireflection effect to an observer viewing the film 11 from the front direction. Therefore, the visibility of the film 11, that is, an article observed through the film 11 (e.g. a display), when the film 11 is observed from the front direction, can be improved.

In order to give different inclination angles to the inclined protrusions and/or to vary the number density of the inclined protrusions in the main face of the film 11, the pressing pressure is changed upon rubbing the film 11.

In addition, the film 11 may be provided with a pattern due to the difference in refractive index by appropriately changing the direction and/or pressing pressure of rubbing on the film 11. For example, the rubbed portion of the film 11 may be made cloudy and the degree of cloudiness may be varied depending on the rubbing intensity (pressing pressure). Thereby, an image can be illustrated on the film 11. As mentioned here, control of the refractive index of the film 11 enables Embodiments 1 and 2 to be applied to interior and exterior ornaments. An image-illustrated film 11 may be attached to a transparent glass.

In Embodiments 1 and 2, the size of the region where inclined protrusions are formed is not particularly limited as long as the directivity of the optical characteristics of the film is observable.

The method for forming inclined protrusions is preferably a method in which physical force is applied to the protrusions. In addition to the aforementioned method of mechanically rubbing the film using a device such as rubbing device, a method in which a person rubs the film using a soft fibrous material such as cloth or tissue paper may be acceptable.

Alternatively, the inclined protrusions may be formed using a mold with fine holes obliquely formed by laser thereon.

The present application claims priority to Patent Application No. 2009-175703 filed in Japan on Jul. 28, 2009 under the Paris Convention and provisions of national law in a designated State, the entire contents of which are hereby incorporated by reference.

EXPLANATION OF SYMBOLS

11: optical film
12, 12L, 12R: protrusions
13: base layer
14: moth-eye structure
15, 16, 17: region
21: transparent glass plate
23: subject
24: light source
25: luminance meter
26, 27: absorber
31, 32: light
33: reference line
34: inclination angle
35: center line
41: peripheral portion
42: central portion

The invention claimed is:

1. An optical film, comprising
a moth-eye structure comprising multiple protrusions and valleys between the protrusions,
the protrusions including inclined protrusions which are oblique to a main face of the film, the inclined protrusions being irregularly arranged on the main face of the film,
the inclined protrusions having an inclined surface that extends from a base end of the inclined protrusion to an apex, the inclined protrusions being inclined to substantially the same direction in a plan view of the main face,
the inclined surface including at least one curved protrusion being curved at a middle portion in a longitudinal direction thereof, and wherein a tip portion of the inclined protrusions extends over a valley between adjacent inclined portions, the valley being an intersection of side surfaces of adjacent protrusions.

2. The optical film according to claim 1,
wherein the optical film has an optical characteristic that shows directivity in a direction oblique to the main face of the film.

3. The optical film according to claim 1,
wherein the inclined protrusions are formed by application of physical force to the protrusions.

4. The optical film according to claim 1,
wherein the inclined protrusions satisfy a number density of 0.5 pcs/$\mu$m$^2$ or more.

5. The optical film according to claim 1,
wherein the protrusions include the inclined protrusions at a peripheral portion of the optical film, and
the inclined protrusions at the peripheral portion are inclined to the inside of the film in a plan view of the main face of the optical film.

6. The optical film according to claim 1,
wherein the number density of the inclined protrusions varies in the main face of the optical film.

7. The optical film according to claim 1,
wherein the inclined protrusions have different inclination angles in the main face of the optical film.

8. The optical film according to claim 1,
wherein the moth-eye structure has a sticking structure,
the sticking structure includes a plurality of the protrusions whose tip portions are linked to each other, and
the sticking structure satisfies a number density of 0.40 pcs/$\mu$m$^2$ or less.

9. The optical film according to claim 1, wherein the inclined protrusions are oblique to the main face of the film at a first angle, and the inclined protrusions include at least one curved protrusion being curved at a second angle relative to the first angle at the middle portion in a longitudinal direction thereof.

* * * * *